United States Patent [19]
Wagster et al.

[11] Patent Number: 5,325,928
[45] Date of Patent: Jul. 5, 1994

[54] POWER-DRIVEN EDGER WITH ON-CENTER WHEEL

[75] Inventors: Robert P. Wagster, Baltimore; Vernon R. Lacher, Fallston; John S. Vantran, Baltimore, all of Md.

[73] Assignee: Black & Decker Inc., Newark, Del.

[21] Appl. No.: 1,147

[22] Filed: Jan. 7, 1993

[51] Int. Cl.⁵ ............................................. A01D 55/00
[52] U.S. Cl. ...................................... 172/15; 172/17
[58] Field of Search .................. 172/15, 17; 301/64.7

[56] References Cited

U.S. PATENT DOCUMENTS

| | | |
|---|---|---|
| 1,674,847 | 6/1928 | Watson . |
| 2,630,665 | 3/1953 | Lauer . |
| 2,735,252 | 2/1956 | McLendon . |
| 3,086,596 | 4/1963 | Allegretti et al. . |
| 3,168,147 | 2/1965 | Peters . |
| 3,193,996 | 7/1965 | Wellborn . |
| 3,448,812 | 6/1969 | Peters . |
| 3,533,223 | 10/1970 | Gunn et al. . |
| 3,627,054 | 12/1971 | Lay . |
| 3,872,930 | 3/1975 | Campbell . |
| 4,463,544 | 8/1984 | Carsello et al. . |
| 4,592,595 | 6/1986 | Freeman .......................... 301/64.7 |

OTHER PUBLICATIONS

Rose, Arthur and Elizabeth, "The Condensed Chemical Dictionary", Sixth Edition, 1961, p. 5.

Primary Examiner—Randolph A. Reese
Assistant Examiner—Christopher J. Novosad
Attorney, Agent, or Firm—Harness, Dickey & Pierce

[57] ABSTRACT

An electric edger having a transversely mounted electric motor for rotationally driving a vertically oriented cutting blade. The edger is supported by a pair of auxiliary rear wheels and a large on-center front or main wheel that is journalled to a hub that is mounted directly to the exterior of the motor field casing so that the wheel rotates about the motor. The rotational axis of the on-center wheel is substantially aligned with the cutting blade axis and the plane of the wheel is substantially aligned with the center of gravity of the motor subassembly. This configuration, together with the large diameter of the wheel, improves the balance and maneuverability of the edger, particularly around irregularly shaped borders and over uneven terrain, without increasing the overall dimensions of the unit.

27 Claims, 4 Drawing Sheets

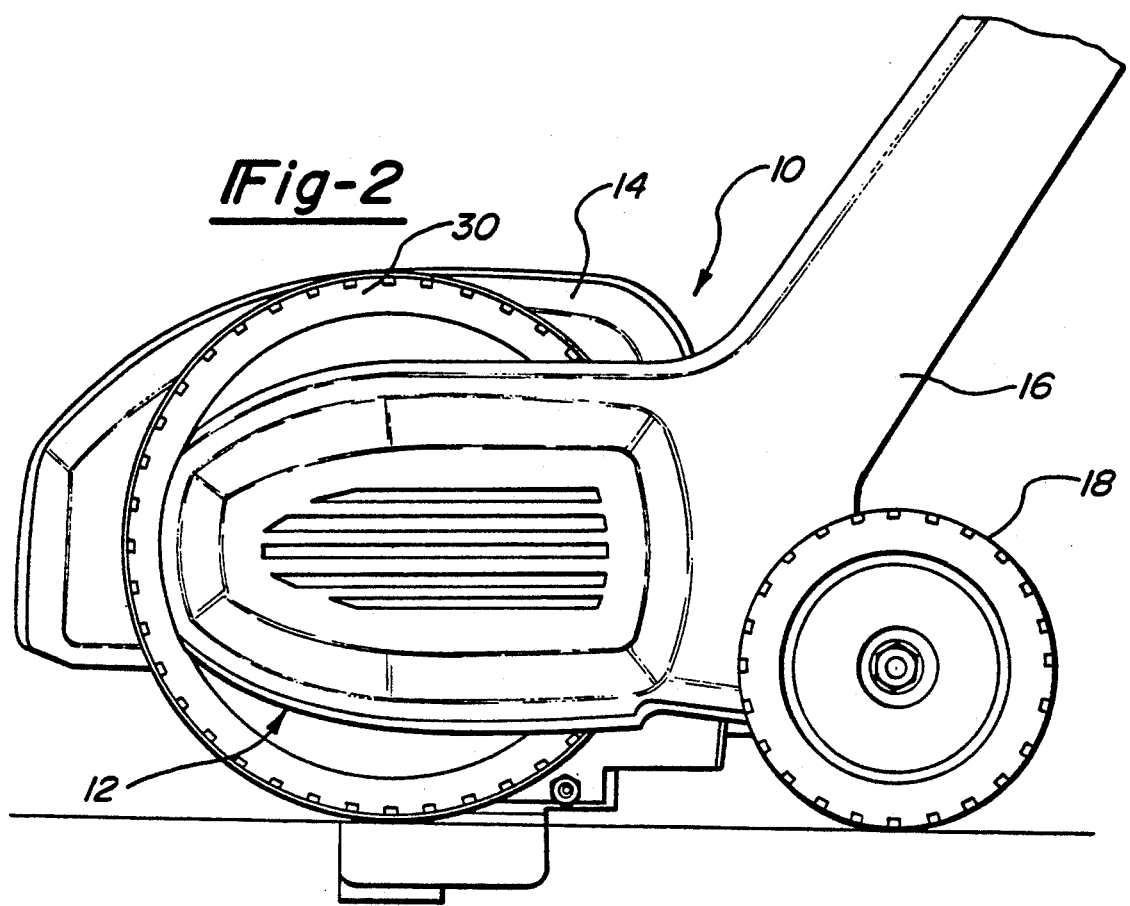
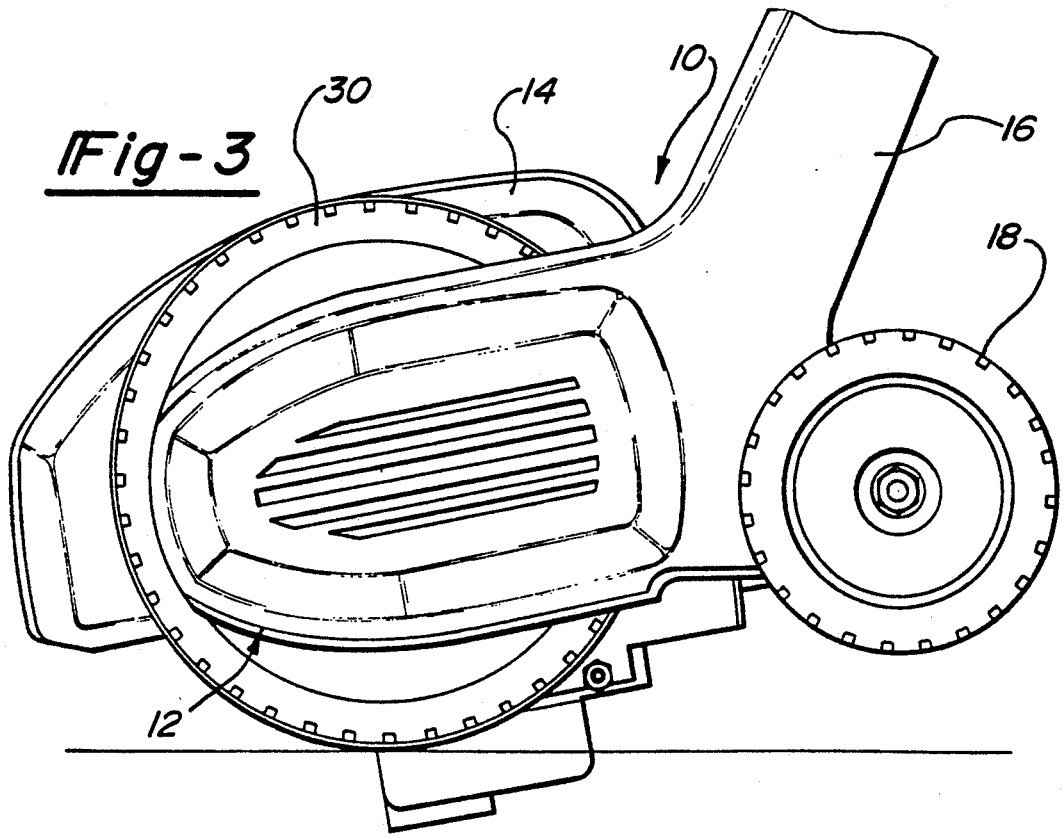

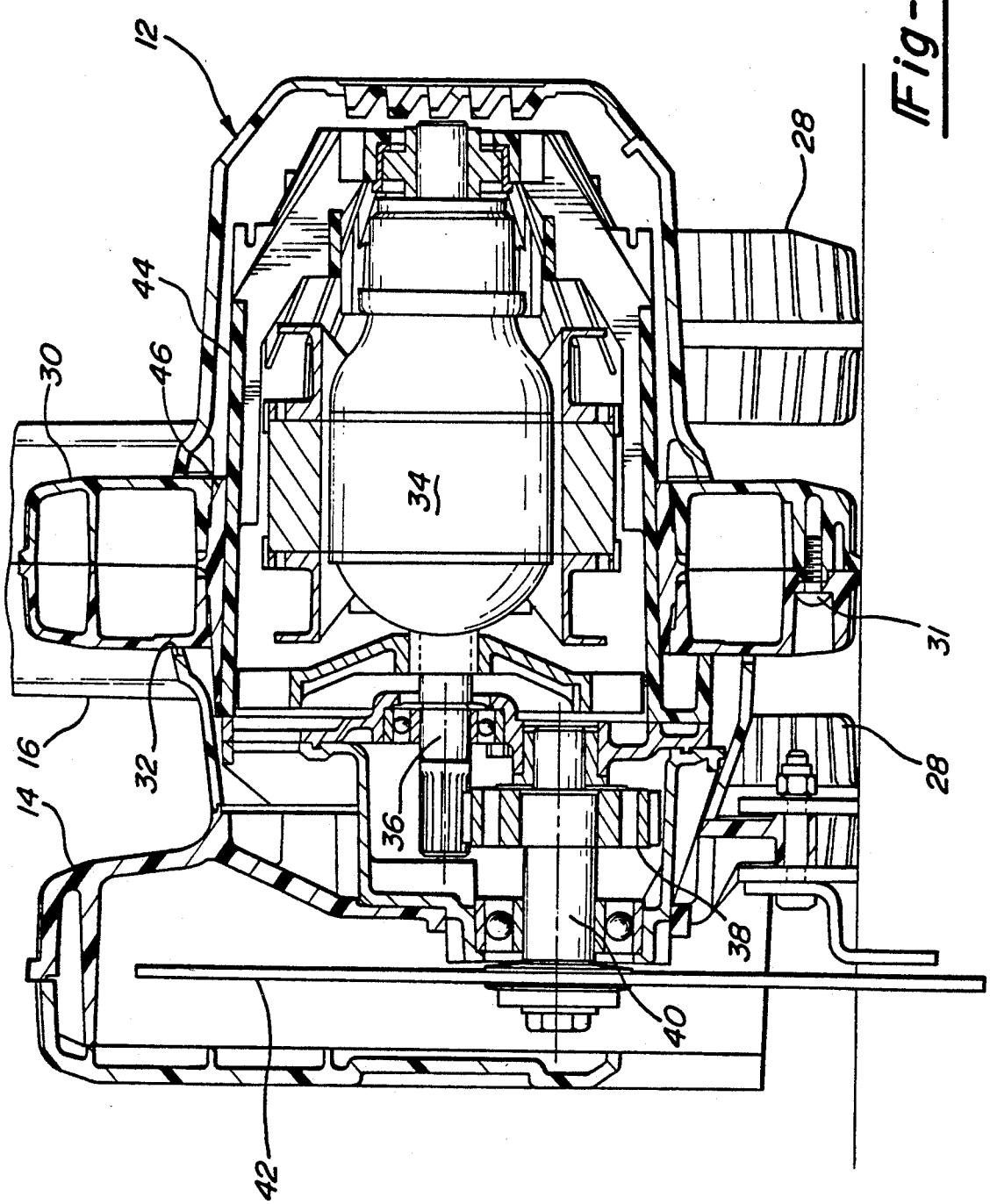

POWER-DRIVEN EDGER WITH ON-CENTER WHEEL

BACKGROUND AND SUMMARY

The present invention relates to edgers and, in particular, to electrical edgers for trimming grass along the borders of a lawn, such as along sidewalks, curbs, driveways, adjacent buildings, and around landscaping.

Electric edgers are widely used to trim along the edges of lawns to provide the lawn with a neat, manicured appearance. Conventional edgers typically comprise a horizontally disposed electric motor that drives a cutting blade that rotates along a vertical plane. The electric motor is mounted to a chassis that is typically supported by a pair of wheels to the rear of the motor and sometimes by a single wheel in front of the motor. To enable the edger to trim as close as possible up to a perpendicular border or wall, the axis of rotation of the cutting blade is typically offset forward of the motor adjacent the front wheel with a drive mechanism connecting the output shaft of the motor with the cutting blade spindle.

While such conventional edgers are certainly adequate for their intended purpose, they do suffer from several disadvantages that compromise their utility. Firstly, conventional electric edgers of the above-described type, by the nature of their design, have a relatively long wheel base which hampers their maneuverability. Consequently, such edgers are difficult to use around sculpted landscape borders. In addition, because it is undesirable to have the front wheel protrude beyond the forward sweep of the cutting blade, the diameter of the front wheel must be kept relatively small. As such, on anything other than relatively smooth, paved surfaces, the front wheel of conventional edgers is easily obstructed. This is especially true when used around landscape borders where the front wheel has a tendency to bury itself in the grass rather than roll over it.

Accordingly, it is an object of the present invention to provide an improved electric edger that is more easily maneuverable than conventional edgers, and yet is stable in the rest position. In addition, it is an object of the present invention to provide an electric edger that is convenient to use not only along straight, paved walkways, but also around irregular-shaped landscape borders where the edger must freely travel over soft and uneven terrain.

Furthermore, it is an object of the present invention to provide an improved edger that achieves these objectives without increasing and, preferably, by even reducing the overall dimensions of the edger. In addition, it is an object of the present invention that the edger be durable, yet economical.

Additional objects and advantages of the present invention will become apparent from a reading of the following detailed description of the preferred embodiment which makes reference to the drawings of which:

BRIEF DESCRIPTION OF THE DRAWINGS

FIG. 2 is a side plan view of the edger of FIG. 1 shown in the normal edging position;

FIG. 3 is a side plan view of the edger of FIG. 1 shown in the "landscaping" position;

FIG. 4 is a front sectional view of the edger of FIG. 1;

DETAILED DESCRIPTION OF THE PREFERRED EMBODIMENT

Figure 1:
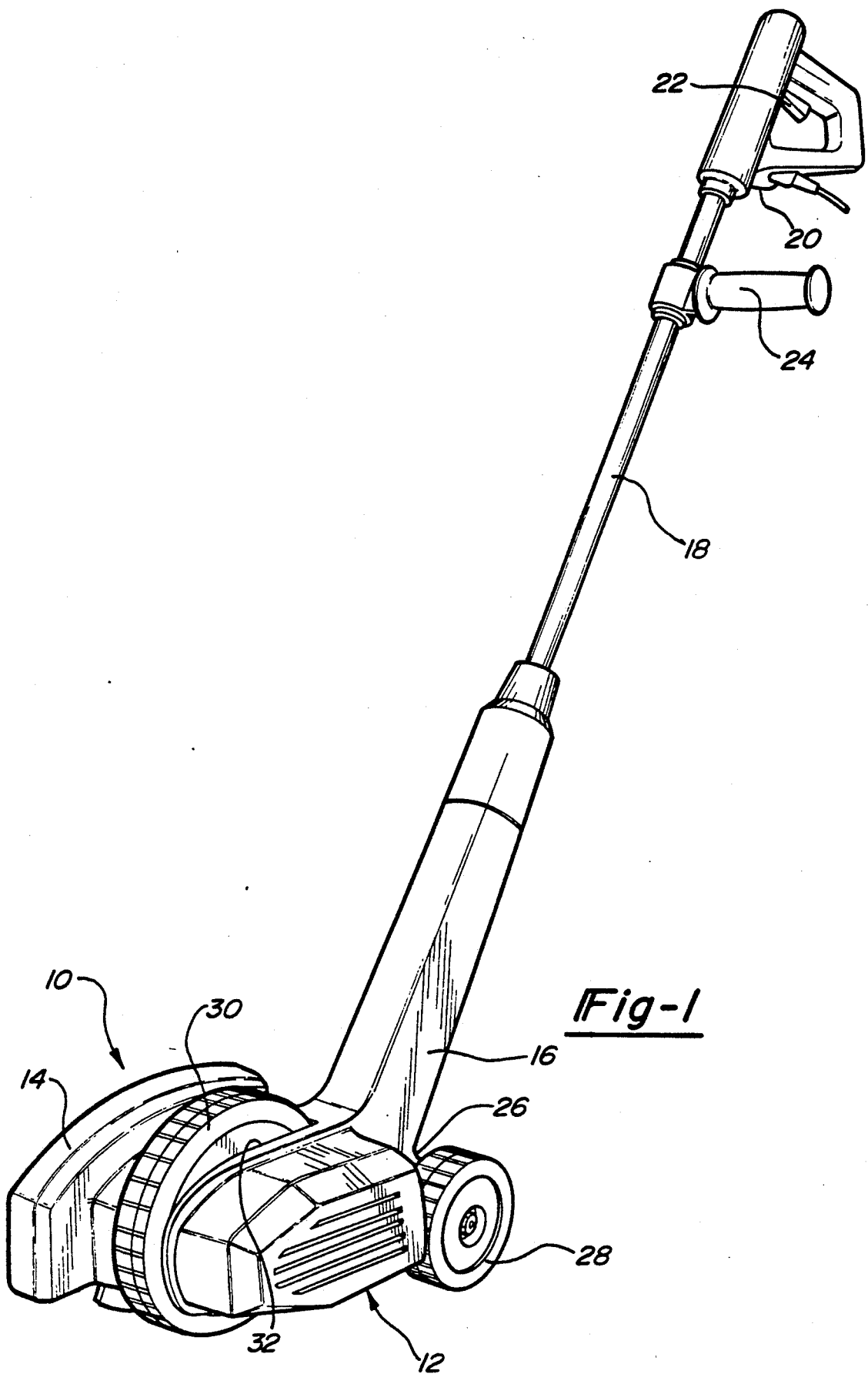
FIG. 1 is a perspective view of an electric edger according to the present invention.

Referring to FIG. 1, a perspective view of an electric edger 10 according to the present invention is shown. The edger 10 comprises a clam-shell type housing 12 that encases the electric motor and has integrally formed therewith a blade guard portion 14 on the side of the housing and a lower handle portion 16 that projects upwardly at an appropriate angle of inclination from the central rear of the main portion of the housing 12. A tubular upper handle 18 extends upwardly from the lower handle portion 16 and has mounted thereto the primary handle grip 20 which incorporates a trigger-type ON/OFF switch 22 for controlling the application of power to the motor. A secondary handle 24 is also preferably provided that can be adjustably positioned on the tubular upper handle 18 to suit the comfort of the particular operator of the edger.

Projecting rearwardly from the juncture of the lower handle portion 16 and the main portion of the housing 12 is an integral extension 26 of the housing that supports the rear axle which has rotatably mounted at its respective ends a pair of auxiliary wheels 28. Preferably, the track of the rear or auxiliary wheels 28 is less than the overall width of the edger 10 so as not to further restrict the spaces that the edger can fit through. The front of the main portion of the housing 12 has formed therein a central slotted opening 32 for receiving a single large diameter wheel 30 that is aligned with the lower handle portion 16 of the housing 12 and which encircles the electric motor.

Figure 5:
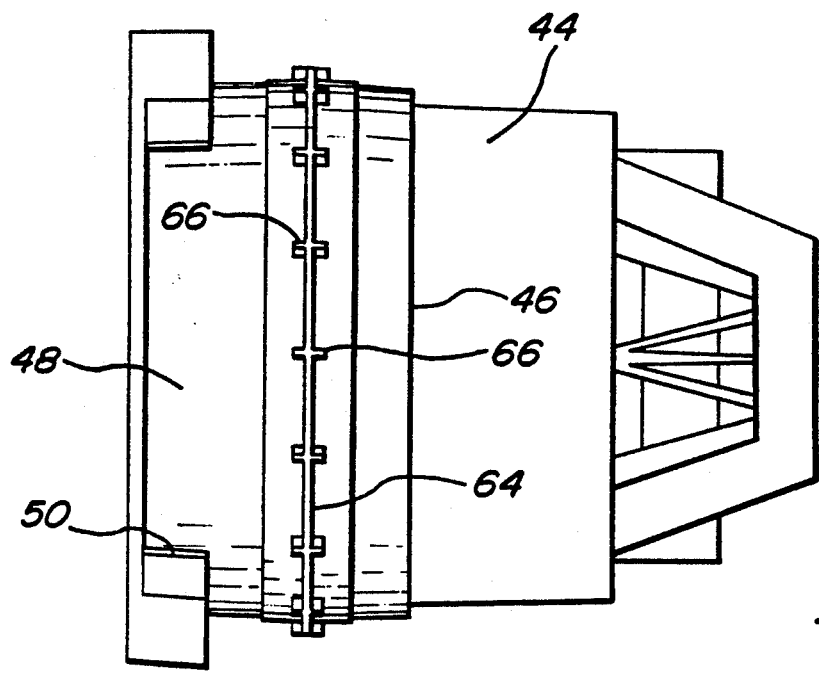
FIG. 5 is a plan view of the motor field casing and front wheel hub subassembly.

With particular reference to FIG. 4, the motor drive subassembly comprises a motor 34 that is transversely mounted in the housing 12 with the output shaft 36 of the motor geared to a reduction gear 38 fixedly connected to the output spindle 40 for rotatably driving the cutting blade 42. Mounted directly onto the field casing 44 of the motor 34 is a hub 46 for the front wheel 30. Additionally, referring to FIG. 5 the hub 46 is frictionally fitted onto the motor field casing 44 and includes a circumferential flange portion 48 that is adapted to be received within a correspondingly configured recess 50 formed on the exterior surface of the motor field casing 44. The resulting interlocking relationship between the flange portion 48 of the hub 46 and the recess 50 in the motor field casing 44 prevents relative rotation between the hub 46 and motor casing 44.

Figure 6:
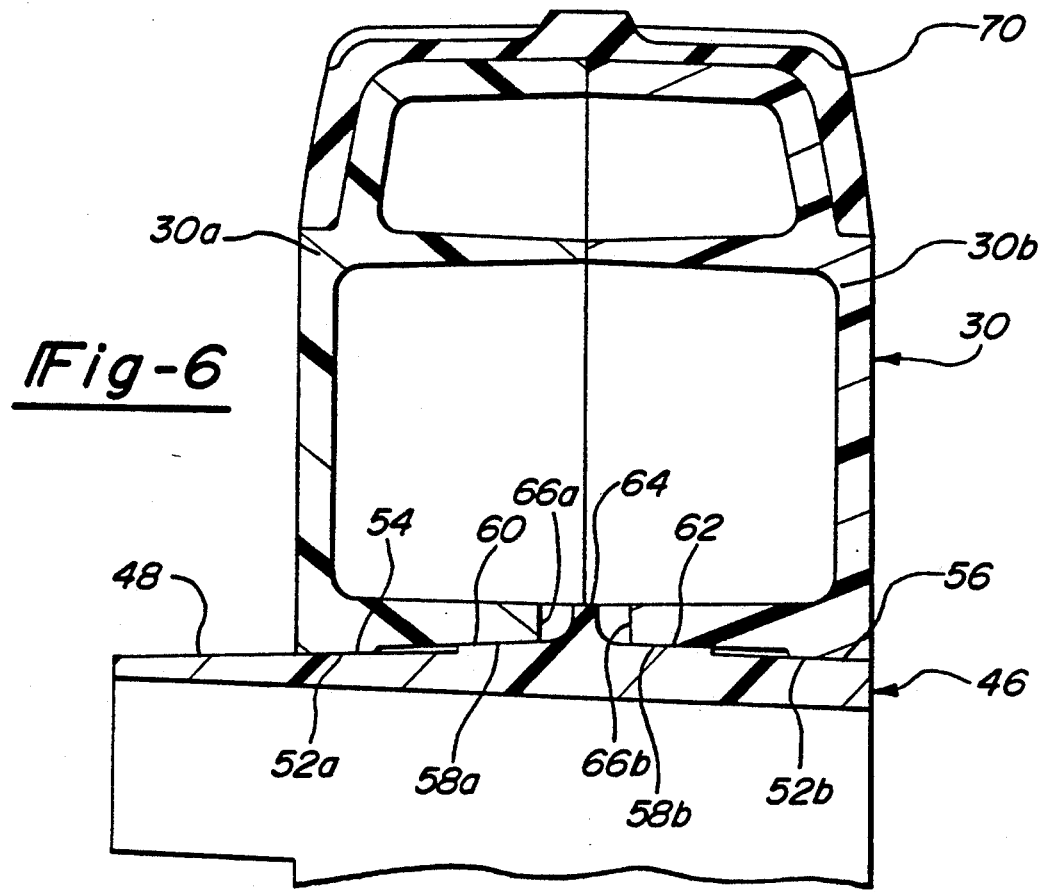
FIG. 6 is an enlarged sectional view of the front wheel and hub subassembly.

As best shown in FIG. 6, the hub 46 is adapted to provide a bearing surface for the large on-center front or main wheel 30. The front wheel 30 in the preferred embodiment is comprised of two clam-shell half sections 30a and 30b that are bolted together via bolts 31 (FIG. 4) when joined along a plane perpendicular to the axis of the wheel. Each of the half sections 30a and 30b is provided with a raised or stepped outer bearing surface 52a and 52b that is adapted to engage the outer bearing support surfaces 54 and 56, respectively, on the hub 46. In addition, each of the half sections 30a and 30b is also provided with an inner bearing surface 58a and 58b that is adapted to engage the raised or stepped inner bearing support surfaces 60 and 62, respectively, on the hub 46. The spaced bearing surfaces between the hub 46 and each half-section 30a and 30b of the wheel serve to provide proper load support for the wheel while minimizing the total surface area interface between the wheel 30 and hub 46 to reduce the friction and wear of the wheel and hub at the interface.

Additionally, it will be noted that the hub 46 further includes a central raised rib 64 that is integrally formed around the entire circumference of the hub. Spaced at regular intervals along the center rib 64 is a plurality of short transverse ribs 66 of uniform length. The ends of the short transverse ribs 66 are adapted to engage the spaced apart, inwardly facing edge surfaces 66a and 66b on the two wheel halves 30a and 30b when assembled onto the hub 46. The center rib network 64 and 66 on the hub 46 serves to keep the wheel 30 centered on the hub 46 and further prevents the wheel from wobbling as it rotates about the hub 46. In addition, the spaced transverse ribs 66 further minimize the frictional interface between the inner facing edge surfaces 66a and 66b of the wheel halves 30a and 30b and the hub 46.

The above-described construction of the front wheel 30 and hub 46 subassembly permits these components to be made from relatively inexpensive plastic material without compromising the durability of the edger. In particular, the hub 46 in the preferred embodiment is made of an acetal material which produces a relatively hard, smooth, and somewhat "oily" surface texture. The characteristics of this material enable the hub to exceed the pressure and velocity requirements of this particular application. The front wheel 30 on the other hand is preferably made from a relatively soft plastic material, such as polypropylene which, in combination with the acetal hub 46, produces a durable, low-wear bearing interface between the two components.

Preferably, the front wheel 30 is additionally provided with a suitable tread surface 70 which may consist of a band of rubber material that is applied over the wheel, or is molded directly onto the assembled wheel. Alternatively, the tread for the wheel may be integrally formed on the outer radial surfaces of the two wheel halves 30a and 30b.

Returning to FIGS. 1-4, it will therefore be appreciated that the configuration of the present edger, with its large on-center front wheel 30, provides several advantages over existing power edger designs. Firstly, by virtue of the fact that the on-center wheel 30 encircles the motor 34, the plane of the wheel is substantially aligned with the center of gravity of the motor drive subassembly. Accordingly, the on-center wheel 30 gives the present edger 10 better balance than pre-existing designs. Secondly, as best shown in FIG. 4, the axis of the cutting blade 42 is substantially aligned fore and aft with the axis of the on-center wheel 30. Moreover, the cutting blade 42 is positioned relatively close to the on-center wheel 30. Consequently, the maneuverability of the present edger 10 is greatly enhanced. In particular, when edging along sculpted landscape borders or when rounding tight corners, the present edger 10 is adapted to be tilted forward into the position shown in FIG. 3 with the rear wheels 18 raised off the ground to permit the edger to be pivoted and maneuvered about the on-center front wheel 30. Thus, the fact that the weight of the motor drive subassembly is balanced on the front wheel 30 in this operating position greatly facilitates the user's ability to control the edger.

Thirdly, because the on-center wheel 30 is journalled directly to the motor field casing 44, the diameter of the wheel can be greatly increased without increasing the overall dimensions of the edger 10. The increased wheel diameter enhances the ability of the edger to roll properly over soft or uneven terrain, especially around unpaved landscape borders, which in turn aids the user in achieving a smooth, manicured edge under such conditions.

Of course, when used along straight borders the present edger 10 is adapted to be operated in the normal position shown in FIG. 2 with all three wheels resting on the ground. Operated in this manner, the edger 10 presents a very stable platform and enables the edger to stand upright independently of any user assistance.

While the above description comprises the preferred embodiment, it will be appreciated that the present invention is susceptible to modification and variation without departing the fair meaning or proper scope of the adjoining claims.

What is claimed is:

1. A power edger having a front and rear defining fore and aft directions and including a substantially vertically oriented cutting blade and further including drive means including a transversely disposed electric motor having a rotational axis and a circumferential casing, for rotatably driving said substantially vertically oriented cutting blade, wherein the axis of rotation of said cutting blade is substantially aligned in the fore and aft direction with the axis of said motor and wherein said drive means has associated therewith a center of gravity, comprising:

a wheel assembly including a first wheel, journalled directly to said circumferential casing of said motor so that said first wheel rotates about said motor, said wheel assembly being substantially radially aligned with the center of gravity of said drive means.

2. The power edger of claim 1 wherein said wheel assembly further includes a wheel hub mounted directly to said circumferential casing and said first wheel is journalled to said wheel hub.

3. The power edger of claim 2 further including interlocking means associated with said casing and said wheel hub for preventing relative rotation between said wheel hub and said casing.

4. The power edger of claim 3 wherein said interlocking means comprises a circumferential sector flange integrally formed on said wheel hub and a correspondingly configured recess formed on said casing.

5. The power edger of claim 2 wherein said wheel hub includes a center rib circumferentially disposed about said hub and said wheel includes an internal circumferential slot adapted to engage said center rib for maintaining said first wheel centered on said hub.

6. The power edger of claim 5 wherein said center rib further comprises a plurality of short transverse ribs for engaging said internal slot in said first wheel.

7. The power edger of claim 2 wherein said wheel hub has an inner bearing surface and an outer bearing surface axially spaced from said inner bearing surface.

8. The power edger of claim 7 wherein said first wheel includes corresponding inner and outer bearing surfaces for rotationally engaging said inner and outer bearing surfaces on said wheel hub, and further wherein a radial gap is created between the inner bearing surface interface and the outer bearing surface interface of said wheel and said first wheel hub.

9. The power edger of claim 8 wherein said first wheel and said wheel hub are made from plastic material.

10. The power edger of claim 9 wherein said wheel hub is made from a relatively hard acetal plastic and said first wheel is made from a relatively soft polypropylene plastic.

11. The power edger of claim 1 further including a pair of rear wheels disposed behind said drive means for supporting the rear of said edger, so that said first wheel and said pair of rear wheels together provide a stable platform for said edger.

12. The power edger of claim 11 wherein the diameter of said first wheel is substantially greater than the diameter of said rear wheels.

13. A power edger comprising a housing having a front and rear; defining fore and aft directions a pair of auxiliary wheels supporting one end of said housing; an electric motor transversely mounted in said housing, said motor having a rotational axis and a circumferential field casing; a cutting blade mounted to a substantially horizontally disposed spindle that is substantially aligned in the fore and aft direction with the axis of said motor; drive means coupling said motor to said spindle for rotationally driving said cutting blade; a circumferential blade guard connected to a side of said housing; a wheel hub mounted directly to said field casing of said motor; and a main wheel journalled to said wheel hub so that said main wheel rotates about said motor, said main wheel projecting through a centrally located slot formed in said housing; such that the rotational axis of said cutting blade is substantially aligned in the fore and aft direction with the rotational axis of said main wheel and said main wheel together with said pair of auxiliary wheels together provide a stable platform for said edger.

14. The power edger of claim 12 further comprising interlocking means associated with said field casing and said wheel hub for preventing relative rotation between said wheel hub and said field casing.

15. The power edger of claim 14 wherein said interlocking means comprises a circumferential sector flange integrally formed on said wheel hub and a correspondingly configured recess formed on said field casing.

16. The power edger of claim 13 wherein said wheel hub includes a center rib circumferentially disposed about said hub and said main wheel includes an internal circumferential slot adapted to engage said center rib for maintaining said main wheel centered on said hub.

17. The power edger of claim 16 wherein said center rib further comprises a plurality of short transverse ribs for engaging said internal slot in said main wheel.

18. The power edger of claim 13 wherein said wheel hub has an inner bearing surface and an outer bearing surface axially spaced from said inner bearing surface.

19. The power edger of claim 18 wherein said main wheel includes corresponding inner and outer bearing surfaces for rotationally engaging said inner and outer bearing surfaces on said wheel hub, and further wherein a related gap is created between the inner bearing surface interface and the outer bearing surface interface of said main wheel and said wheel hub.

20. The power edger of claim 19 wherein said main wheel and said wheel hub are made from plastic material.

21. The power edger of claim 20 wherein said wheel hub is made from a relatively hard acetal plastic and said main wheel is made from a relatively soft polypropylene plastic.

22. The power edger of claim 13 wherein the diameter of said main wheel is substantially greater than the diameter of said auxiliary wheels.

23. The power edger of claim 13 wherein said motor and said drive means has associated therewith a combined center of gravity and further wherein said main wheel is substantially radially aligned with said center of gravity.

24. A power edger having a front and rear and including a substantially vertically oriented cutting blade and further including drive means including a transversely disposed electric motor having a rotational axis and a circumferential casing, for rotatably driving said substantially vertically oriented cutting blade, wherein said drive means has associated therewith a center of gravity, comprising:
   a wheel assembly including a first wheel, journalled directly to said circumferential casing of said motor so that said first wheel completely surrounds and rotates about said motor, said wheel assembly being substantially radially aligned with the center of gravity of said drive means.

25. The power edger of claim 21 wherein said wheel assembly further includes a wheel hub mounted directly to said circumferential casing and said first wheel is journalled to said wheel hub.

26. The power edger of claim 21 further including a pair of rear wheels disposed behind said drive means for supporting the rear of said edger, so that said first wheel and said pair of rear wheels together provide a stable platform for said edger.

27. The power edger of claim 23 wherein the diameter of said first wheel is substantially greater than the diameter of said rear wheels.

* * * * *

UNITED STATES PATENT AND TRADEMARK OFFICE
CERTIFICATE OF CORRECTION

PATENT NO. : 5,325,928

DATED : July 5, 1994

INVENTOR(S) : Robert P. Wagster et al.

It is certified that error appears in the above-identified patent and that said Letters Patent is hereby corrected as shown below:

Column 5, line 17, claim 13, after "rear", delete " ; ", and after "directions", insert --;--.

Column 6, line 40, claim 25, "21" should be --24--.

Column 6, line 44, claim 26, "21" should be --24--.

Column 6, line 49, claim 27, "23" should be --26--.

Signed and Sealed this

Twenty-fifth Day of October, 1994

Attest:

BRUCE LEHMAN

Attesting Officer

Commissioner of Patents and Trademarks